(12) United States Patent
Gong et al.

(10) Patent No.: US 12,504,537 B2
(45) Date of Patent: Dec. 23, 2025

(54) RADAR DATA PROCESSING METHOD, TERMINAL DEVICE, AND COMPUTER-READABLE STORAGE MEDIUM

(71) Applicant: SUTENG INNOVATION TECHNOLOGY CO., LTD., Shenzhen (CN)

(72) Inventors: Changsheng Gong, Shenzhen (CN); Yan Song, Shenzhen (CN); Keqin Yang, Shenzhen (CN)

(73) Assignee: SUTENG INNOVATION TECHNOLOGY CO., LTD., Shenzhen (CN)

(*) Notice: Subject to any disclaimer, the term of this patent is extended or adjusted under 35 U.S.C. 154(b) by 422 days.

(21) Appl. No.: 17/970,499

(22) Filed: Oct. 20, 2022

(65) Prior Publication Data

US 2023/0126462 A1    Apr. 27, 2023

(30) Foreign Application Priority Data

Oct. 22, 2021 (CN) .......................... 202111236151.3

(51) Int. Cl.
*G01S 17/32* (2020.01)
*G01S 7/4913* (2020.01)

(52) U.S. Cl.
CPC ............ *G01S 17/32* (2013.01); *G01S 7/4913* (2013.01)

(58) Field of Classification Search
CPC .......... G01S 17/02; G01S 17/04; G01S 17/06; G01S 17/08; G01S 17/32; G01S 17/34; G01S 17/36; G01S 17/48; G01S 17/4802; G01S 17/4804; G01S 17/4806; G01S 17/4808; G01S 17/481; G01S 17/4816; G01S 17/491; G01S 17/4911; G01S 17/4912; G01S 17/4913; G01S 17/4914; G01S 17/493
See application file for complete search history.

(56) References Cited

U.S. PATENT DOCUMENTS

| 10,761,196 B2* | 9/2020 | Dussan ................. G01S 7/4813 |
| 2020/0041614 A1 | 2/2020 | Donovan et al. |
| 2020/0341147 A1* | 10/2020 | Dussan ................... G01S 7/487 |
| 2020/0386868 A1 | 12/2020 | Donovan et al. |
| 2022/0057489 A1* | 2/2022 | Zhou ..................... G01S 7/4811 |

(Continued)

FOREIGN PATENT DOCUMENTS

| CN | 113253234 A | 8/2021 |
| CN | 113433564 A | 9/2021 |

OTHER PUBLICATIONS

European Search Report issued in corresponding European Application No. 22202936.5, mailed Feb. 24, 2023, 7 pages.

(Continued)

*Primary Examiner* — Georgia Y Epps
(74) *Attorney, Agent, or Firm* — BAYES PLLC

(57) ABSTRACT

A radar data processing method, a terminal device, and a computer-readable storage medium are provided. The method includes: obtaining a target receiving unit group corresponding to an emission unit; obtaining echo data received by the target receiving unit group; converging the echo data to obtain a convergence result; and determining a distance of a target object based on the convergence result.

13 Claims, 13 Drawing Sheets

(56) References Cited

U.S. PATENT DOCUMENTS

| | | | |
|---|---|---|---|
| 2023/0126462 A1* | 4/2023 | Gong | G01S 7/4808 356/3 |
| 2024/0012120 A1* | 1/2024 | Han | G01S 7/4873 |
| 2024/0069162 A1* | 2/2024 | Liu | G01S 17/931 |
| 2024/0210528 A1* | 6/2024 | An | G01S 7/487 |

OTHER PUBLICATIONS

First Office Action issued in related Chinese Application No. 202111236151.3, mailed Sep. 5, 2023, 10 pages.

* cited by examiner

FIG. 8

RADAR DATA PROCESSING METHOD, TERMINAL DEVICE, AND COMPUTER-READABLE STORAGE MEDIUM

CROSS-REFERENCE TO RELATED APPLICATION

The present application claims the benefit of priority to China Patent Application No. CN202111236151.3, filed on Oct. 22, 2021, the content of which is incorporated herein by reference in its entirety.

TECHNICAL FIELD

This application pertains to the field of radar technologies, and particularly relates to a radar data processing method, a terminal device, and a computer-readable storage medium.

BACKGROUND

LiDARs are usually used in fields such as automated driving, transport vehicles, robots, and public smart transportation due to their advantages such as high resolution, high sensitivity, strong anti-interference ability, and all-weather availability.

In a LiDAR system performing emission and reception non-coaxially, because there is an interval between an emission unit and a receiving unit, when a position of a target object changes, a position of a received light spot also shifts, and in this way, a receiving unit in a transceiving correspondence cannot receive an echo signal. In other words, the target object cannot be detected.

SUMMARY

Embodiments of this application provide a radar data processing method, a terminal device, and a computer-readable storage medium, to resolve an existing problem that a receiving unit in existing LiDAR cannot effectively receive an echo and the target object cannot be detected due to a corresponding transceiving relationship.

According to a first aspect, an embodiment of this application provides a radar data processing method, including:
  obtaining a target receiving unit group corresponding to an emission unit;
  obtaining echo data received by the target receiving unit group, where the target receiving unit group includes N receiving units and N is a positive integer greater than 1;
  converging the echo data to obtain a convergence result; and
  determining a distance of a target object based on the convergence result.

In an embodiment of the first aspect, the number of receiving units in the target receiving unit group is determined based on a value of an emission angle of view of the emission unit and a value of a receiving angle of view of the receiving unit of the LiDAR.

In an embodiment of the first aspect, the number of receiving units in the target receiving unit group is determined based on a physical distance between the emission unit and the receiving unit of the LiDAR.

In an embodiment of the first aspect, the target receiving unit group includes an entire row of receiving units.

In an embodiment of the first aspect, the echo data is data obtained by controlling LiDAR to scan in a preset scanning method.

In an embodiment of the first aspect, converging the echo data to obtain a convergence result includes:
  converging a plurality of pieces of received echo data based on a same receiving unit until all echo data is converged.

In an embodiment of the first aspect, converging the echo data to obtain a convergence result further includes:
  calculating a receiving range based on a distance value of each receiving unit and a position of the emission unit;
  determining a main receiving unit based on the receiving range;
  determining weight of received data of each receiving unit based on a distance between each receiving unit and the main receiving unit;
  weighting the echo data based on the weight of the received data of each receiving unit; and
  converging weighted echo data based on the same receiving unit until all the echo data is converged.

According to a second aspect, an embodiment of this application provides a terminal device, including:
  a first obtaining unit, configured to obtain a target receiving unit group corresponding to an emission unit;
  a second obtaining unit, configured to obtain echo data received by the target receiving unit group, where the target receiving unit group includes N receiving units and N is a positive integer greater than 1;
  a converging unit, configured to converge the echo data to obtain a convergence result; and
  a determining unit, configured to determine a distance of a target object based on the convergence result.

According to a third aspect, an embodiment of this application provides a terminal device, where the terminal device includes a processor, a memory, and a computer program stored in the memory and capable of running on the processor, where when the processor executes the computer program, the method according to the first aspect or any one of the optional embodiments of the first aspect is implemented.

According to a fourth aspect, an embodiment of this application provides a computer-readable storage medium, where the computer-readable storage medium stores a computer program, and when the computer program is executed by a processor, the method according to the first aspect or any one of the exemplary embodiments of the first aspect is implemented.

According to a fifth aspect, an embodiment of this application provides a computer program product, where when the computer program product runs on a terminal device, the terminal device performs the method according to the first aspect or any exemplary embodiment of the first aspect.

The radar data processing method, the terminal device, the computer-readable storage medium, and the computer program product provided in the embodiments of this application have the following beneficial effects:

In the radar data processing method provided in the embodiments of this application, the target receiving unit with the mapping offset is covered, to receive the echo data, and then the plurality of pieces of received echo data is converged, to ensure complete reception of the echo signal. Then, ranging is performed based on the converged data, to accurately obtain the position of the target object, thereby solving a problem that the receiving unit in the existing LiDAR cannot effectively receive the echo and the target object cannot be detected due to the corresponding transceiving relationship.

BRIEF DESCRIPTION OF DRAWINGS

To explain the technical solution in embodiments of this application, the following briefly introduces the accompanying drawings to describe the embodiments or the prior art. The accompanying drawings in the following description are only some embodiments in this application. A person of ordinary skill in the art may still derive other drawings from these accompanying drawings without creative efforts.

FIG. 8 is a schematic diagram of a data convergence scenario according to an embodiment of this application;

DETAILED DESCRIPTION

Figure 1:
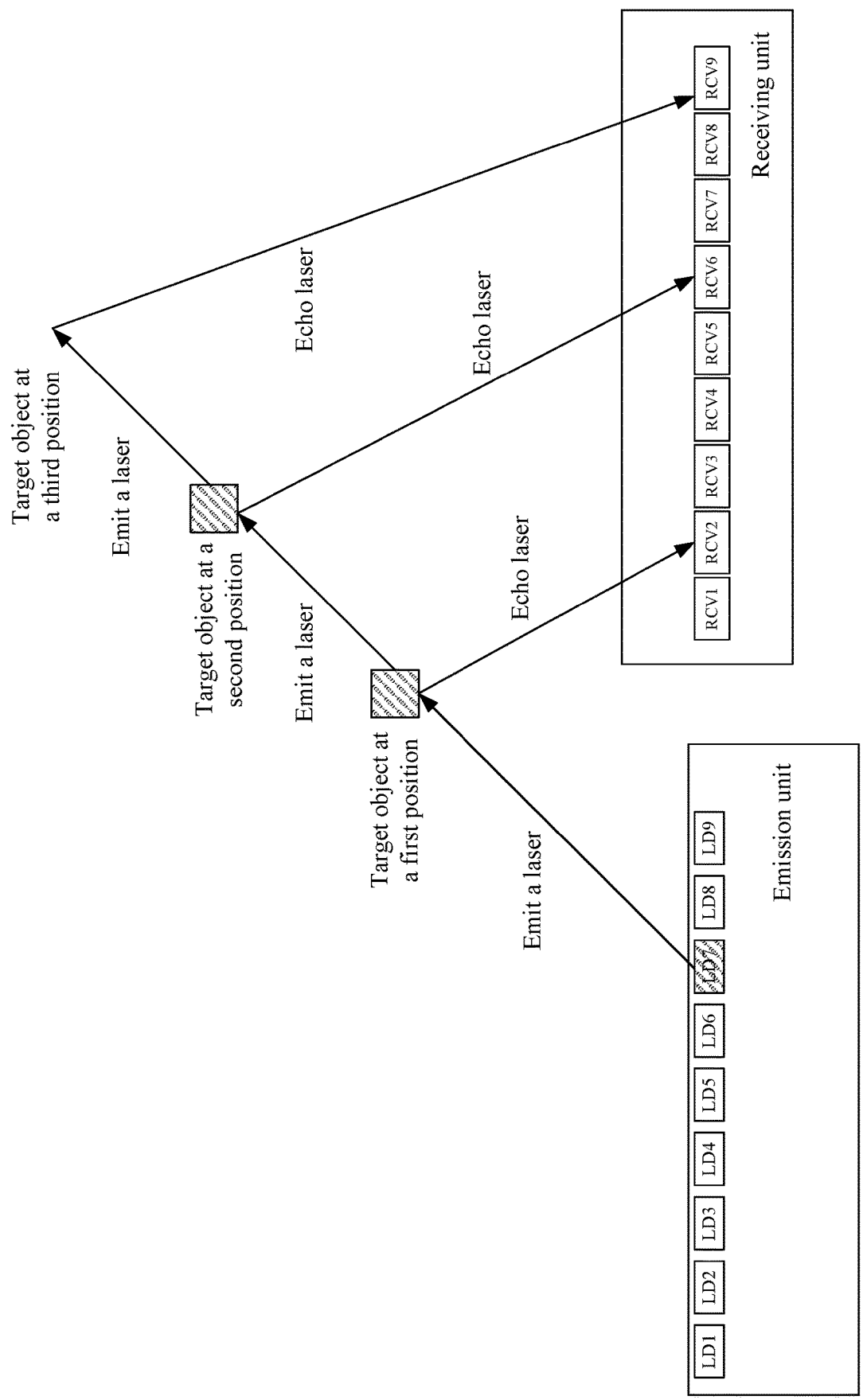
FIG. 1 is a schematic diagram of an exemplary scenario in which mapping offset occurs during emission and receiving in a non-coaxial LiDAR.

For the purpose of illustration rather than limitation, the following describes details such as a system structure and technology, to facilitate a thorough understanding of the embodiments of this application. However, a person skilled in the art should understand that this application can also be implemented in other embodiments without these details. In other cases, detailed descriptions of well-known systems, apparatuses, circuits, and methods are omitted, to prevent unnecessary details from causing distraction from the description of this application.

It should be understood that the term "and/or" used in this specification and appended claims of this application refers to any combination of one or more of the associated items listed and all possible combinations thereof, and inclusion of these combinations. In addition, in the descriptions of this specification and the appended claims of this application, the terms "first," "second," "third," and the like are merely intended for differential description, and should not be understood as any indication or implication of relative importance.

It should be further understood that reference to "an embodiment," "some embodiments," or the like described in this specification of this application means that one or more embodiments of this application include a feature, structure, or characteristic described with reference to the embodiments. Therefore, expressions such as "in an embodiment," "in some embodiments," "in some other embodiments," and "in some additional embodiments" appearing in different places in this specification do not necessarily indicate a reference to the same embodiment, but mean "one or more but not all embodiments," unless otherwise specified in another way. The terms "include," "comprise," "have," and variants thereof all mean "including but not limited to," unless otherwise specified in another way.

A LiDAR is an automated remote sensing device for detection using a laser as an emitting light source and a photoelectric detection technology. A LiDAR can include parts such as an emission unit, a receiving unit, a scanning control system, and a data processing system. A working principle of the LiDAR is that a detection laser is emitted to a target object, after the detection laser reaches the target object, the target object reflects the detection laser to form an echo laser, and the receiving unit can receive the echo laser and process the received echo laser, to obtain information such as distance, size, speed, and reflectivity of the target object.

In an area array LiDAR, an emission unit includes a plurality of emitters or emission lasers (VECSEL sub-blocks). In a LiDAR with a transceiving correspondence, a laser emitted by one emitter or emission laser in the emission unit is received by a corresponding receiving block in a receiving area array of the receiving unit. Exemplarily, as shown in FIG. 1, an echo laser is generated after a laser emitted by an emitter, e.g., a laser diode, LD1. in the emission unit is incident on a target object and is received by a receiving block RCV1 in the receiving unit; an echo laser is generated after a laser emitted by an LD2 in the emission unit is incident on the target object and is received by a receiving block RCV2 in the receiving unit; an echo laser is generated after a laser emitted by an LD3 in the emission unit is incident on the target object and is received by a receiving block RCVRCV3 in the receiving unit, and so on.

It can also be seen from FIG. 1 that if the target object is moving, that is, a position of the target object changes relative to the LiDAR, then for a non-coaxial LiDAR, mapping offset occurs during emission and receiving. As shown in FIG. 1, in the LiDAR, an LD7 in the emission unit is configured to emit a laser, and when the laser is incident on the target object in a first position, a returned echo laser is incident on the receiving block RCV2 of the receiving unit; when the laser is incident on the target object in a second position (that is, the target object moves from the first position to the second position), a returned echo laser is incident on a receiving block RCV6 of the receiving unit; or when the laser is incident on the target object in a third position, a returned echo laser is incident on a receiving block RCV9 of the receiving unit. That is, in this case, the receiving block RCV7 of the receiving unit cannot receive the echo laser. In addition, because the position of the target object is changeable, during measurement, the LiDAR cannot predict which receiving block should be used for reception, and even if the target object is within an effective measurement range and an effective angle of view, the LiDAR cannot detect the target object (this is because no echo laser is received).

In view of this, an embodiment of this application provides a radar data processing method as below.

Figure 2:
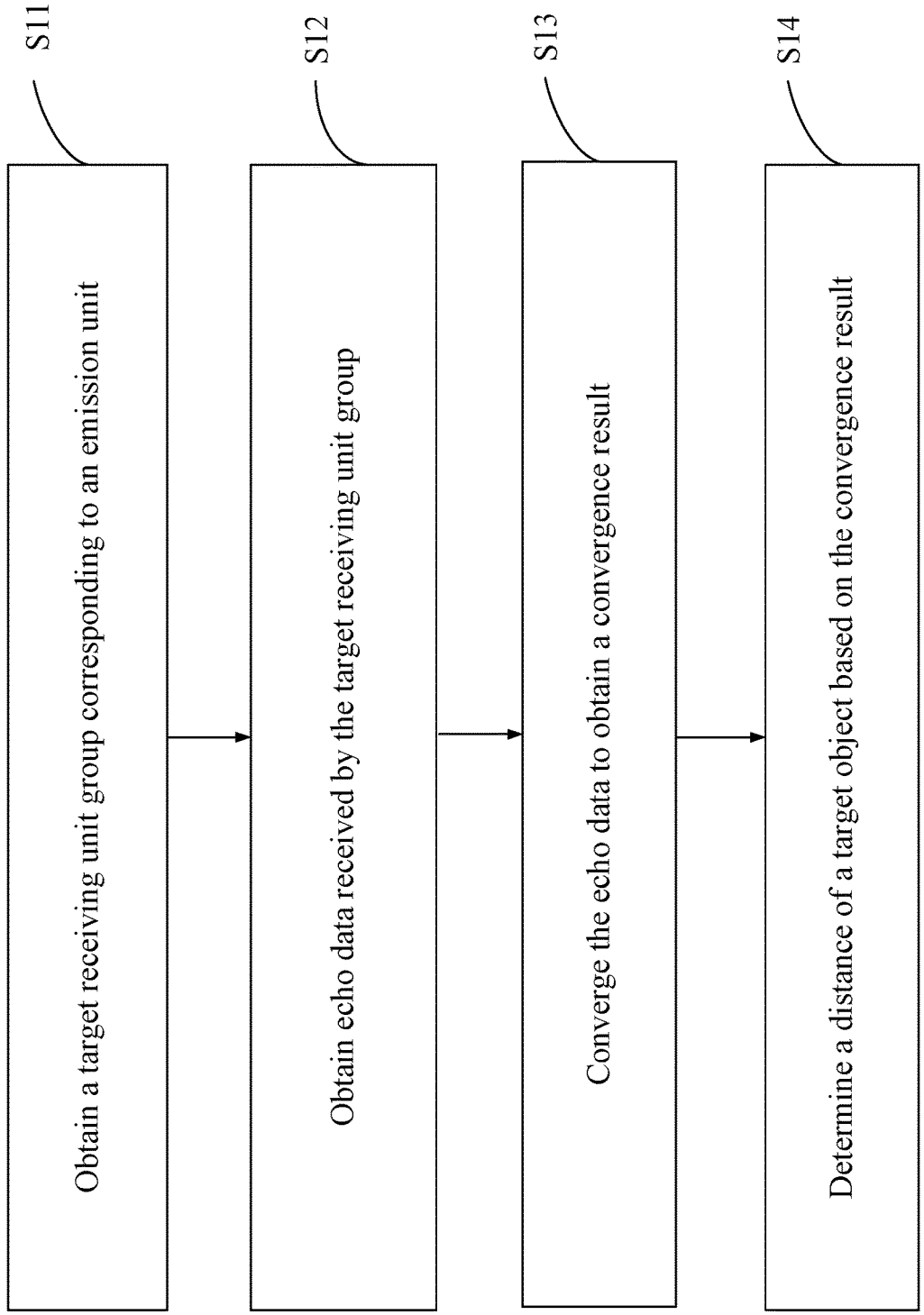
FIG. 2 is a schematic flowchart of a radar data processing method according to an embodiment of this application.

Referring to FIG. 2, FIG. 2 is a schematic flowchart of a radar data processing method according to an embodiment of this application. The radar data processing method provided in this embodiment of this application may be performed by a data processing system inside the LiDAR, or may be performed by a terminal device that is communicatively connected to the LiDAR. The terminal device may be a mobile terminal such as a smartphone, tablet computer, or wearable device, or may be a device such as a computer, cloud server, or radar-assisted computer in various application scenarios. It should be noted that the radar data processing method provided in this embodiment of this application is mainly applicable to an area array LiDAR product and array type LiDAR. An example in which the radar data processing method is performed by the terminal device is used for the description below.

As shown in FIG. 2, the radar data processing method provided in this embodiment of this application may include step S11 to step S14. Details are as follows:

S11. Obtain a target receiving unit group corresponding to an emission unit.

In this embodiment of this application, when a distance from the LiDAR to the target object changes, mapping positions of the emission unit and the receiving unit are offset. Therefore, in this embodiment of this application, when the emission unit is controlled to emit a signal, the target receiving unit group is first determined based on the offset of the mapping positions. That is, the target receiving unit group needs to include a receiving unit covering mapping offset at all distances, to ensure that the echo data can be received.

It should be noted that the foregoing target receiving unit group includes N receiving units, where N is a positive integer greater than 1.

It should also be noted that, whether the mapping offset at all distances is covered can be determined based on a value of an emission angle of view of the emission unit and a value of a receiving angle of view of the receiving unit of the LiDAR, and a physical distance between the emission unit and the receiving unit.

During application, the number of receiving units in the target receiving unit group may be determined based on the value of the emission angle of view of the emission unit and the value of the receiving angle of view of the receiving unit of the LiDAR. In some embodiments, the number of receiving units in the target receiving unit group may be directly proportional to the value of the emission angle of view of the emission unit and the value of the receiving angle of view of the receiving unit of the LiDAR. That is, the greater the value of the emission angle of view of the emission unit and the value of the receiving angle of view of the receiving unit of the LiDAR, the greater the number of receiving units included in the target receiving unit group.

During application, the number of receiving units in the target receiving unit group may be further determined based on the physical distance between the emission unit and the receiving unit of the LiDAR. In some embodiments, the number of receiving units in the target receiving unit group may be directly proportional to the physical distance between the emission unit and the receiving unit of the LiDAR. That is, the greater the physical distance between the emission unit and the receiving unit of the LiDAR, the greater the number of receiving units included in the target receiving unit group.

In addition, to determine the number of receiving units in the target receiving unit group, the position of the emission unit in an emission array can also be considered. If the emission unit is at an edge of the emission array (for example, LD1, LD2, LD8, or LD9 in FIG. 3), the target receiving unit group includes fewer receiving units.

Figure 3:
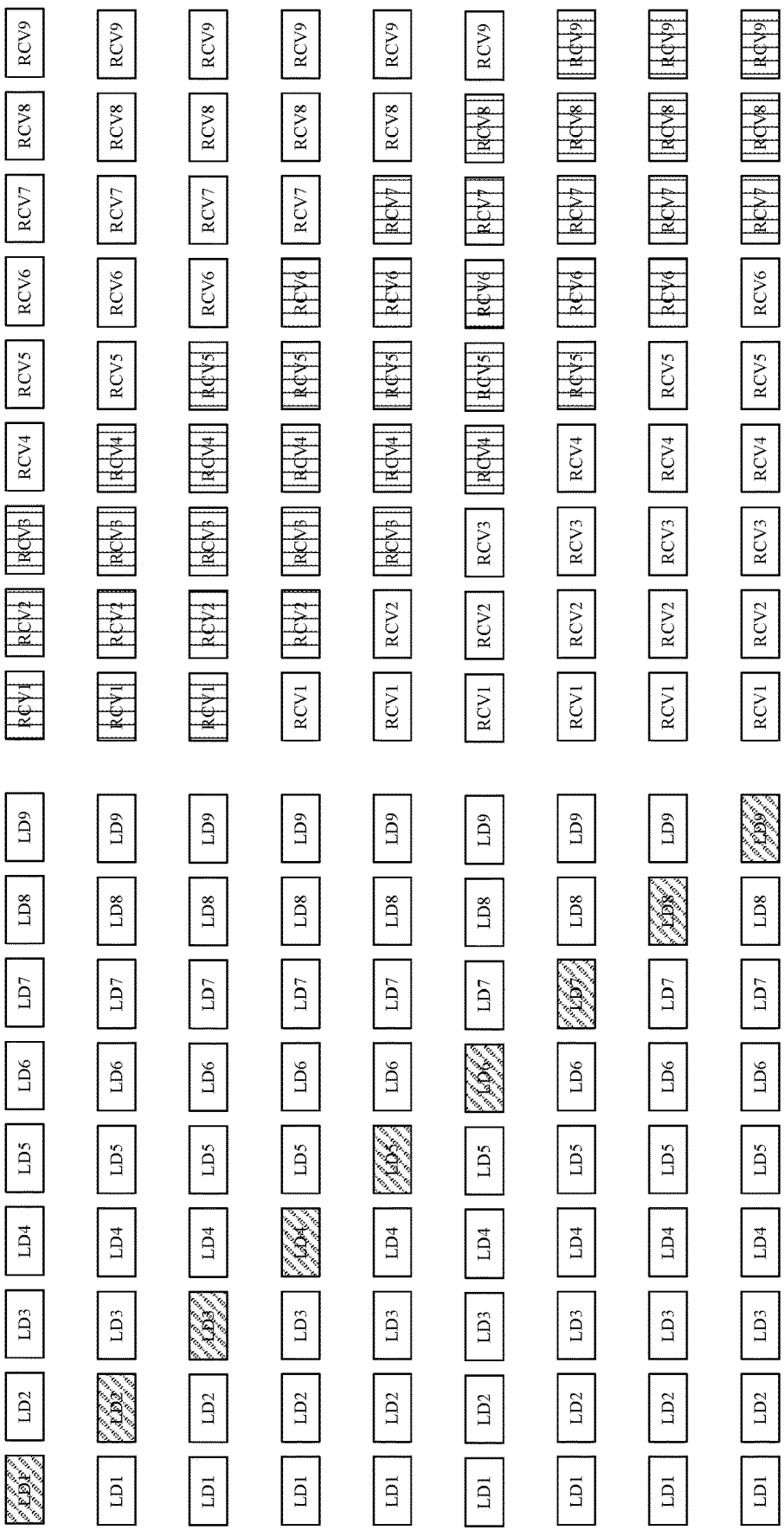
FIG. 3 is a schematic diagram of a transceiving relationship between an emission unit and a target receiving unit group according to an embodiment of this application.

To more intuitively describe the transceiving relationship between the emission unit and the target receiving unit, FIG. 3 is an example diagram of a transceiving relationship between an emission unit and a target receiving unit group according to an embodiment of this application. As shown in FIG. 3, when the emission unit is LD1, a corresponding target receiving unit group includes three receiving units RCV1, RCV2, and RCV3; when the emission unit is LD2, a corresponding target receiving unit group includes four receiving units RCV1, RCV2, RCV3, and RCV4; when the emission unit is LD3, a target receiving unit group includes five receiving units RCV1, RCV2, RCV3, RCV4, and RCV5; when the emission unit is LD4, the target receiving unit group includes five receiving units RCV2, RCV3, RCV4, RCV5, and RCV6; when the emission unit is LD5, a target receiving unit group includes five receiving units RCV3, RCV4, RCV5, RCV6, and RCV7; when the emission unit is LD6, a target receiving unit group includes five receiving units RCV4, RCV5, RCV6, RCV7, and RCV8; when the emission unit is LD7, a target receiving unit group includes five receiving units RCV5, RCV6, RCV7, RCV8, and RCV9; when the emission unit is LD8, a target receiving unit group includes four receiving units RCV6, RCV7, RCV8, and RCV9; or when the emission unit is LD9, a target receiving unit group includes three receiving units RCV7, RCV8, and RCV9.

When mapping offset of the LiDAR is relatively large, the target receiving unit group may include an entire row of receiving units.

Figure 4:
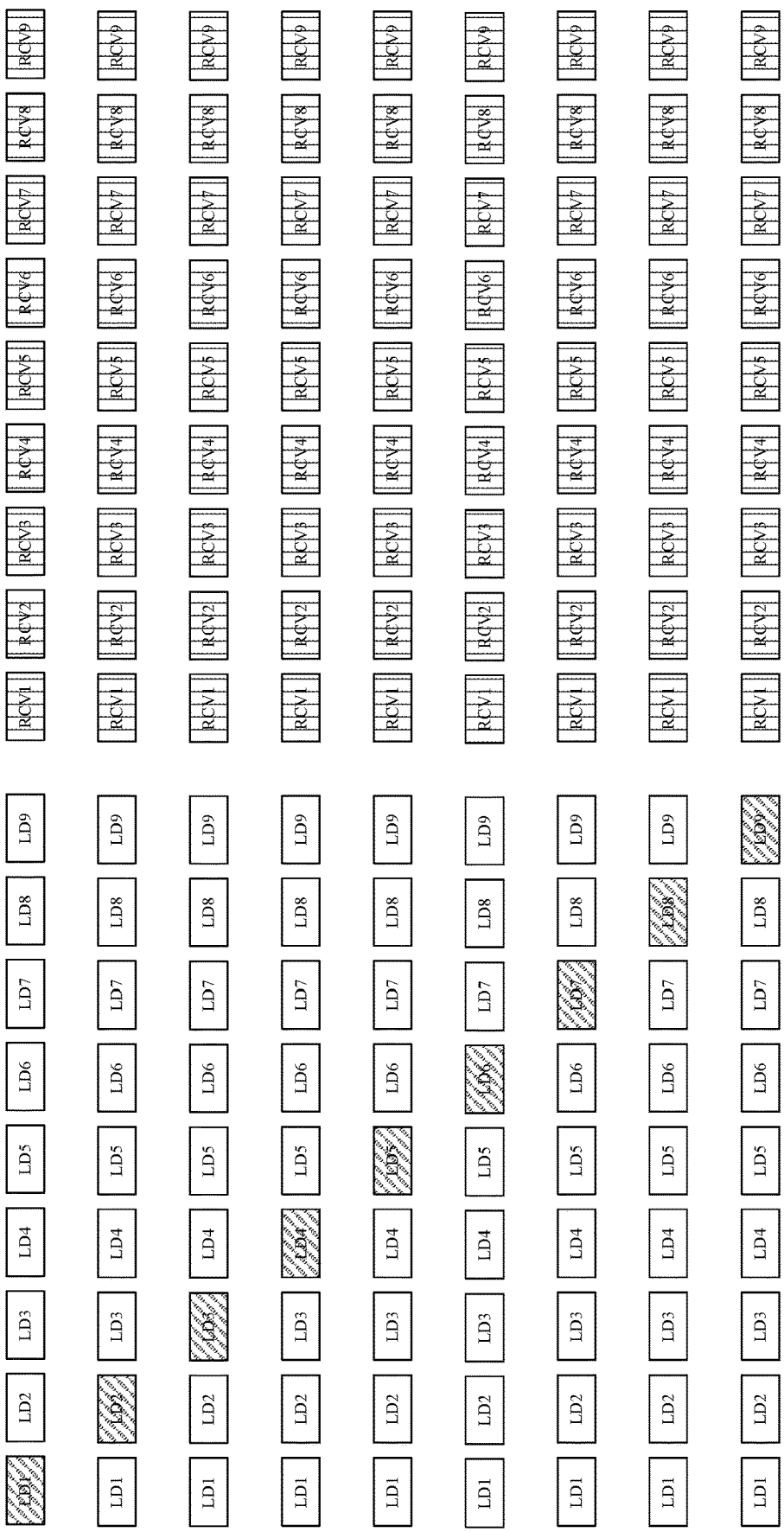
FIG. 4 shows a transceiving relationship between an emission unit and a row of receiving units according to an embodiment of this application.

To more intuitively describe a transceiving relationship between an emission unit and row-wise receiving, FIG. 4 is an example diagram of a transceiving relationship between an emission unit and row-wise receiving according to an embodiment of this application. As shown in FIG. 4, when the emission unit is LD1, a target receiving unit group includes an entire row of receiving units RCV1, RCV2, RCV3, RCV4, RCV5, RCV6, RCV7, RCV8, and RCV9; when the emission unit is LD2, a target receiving unit group also includes the entire row of receiving units RCV1, RCV2, RCV3, RCV4, RCV5, RCV6, RCV7, RCV8, and RCV9; when the emission unit is LD3, a target receiving unit group also includes the entire row of receiving units RCV1, RCV2, RCV3, RCV4, RCV5, RCV6, RCV7, RCV8, and RCV9; when the emission unit is LD4, a target receiving unit group also includes the entire row of receiving units RCV1, RCV2, RCV3, RCV4, RCV5, RCV6, RCV7, RCV8, and RCV9; when the emission unit is LD5, a target receiving unit group also includes the entire row of receiving units RCV1, RCV2, RCV3, RCV4, RCV5, RCV6, RCV7, RCV8, and RCV9; when the emission unit is LD6, a target receiving unit group also includes the entire row of receiving units RCV1, RCV2, RCV3, RCV4, RCV5, RCV6, RCV7, RCV8, and RCV9; when the emission unit is LD7, a target receiving unit group also includes the entire row of receiving units RCV1, RCV2, RCV3, RCV4, RCV5, RCV6, RCV7, RCV8, and RCV9; when the emission unit is LD8, a target receiving unit group also includes the entire row of receiving units RCV1, RCV2, RCV3, RCV4, RCV5, RCV6, RCV7, RCV8, and RCV9; or when the emission unit is LD9, a target receiving unit group also includes the entire row of receiving units RCV1, RCV2, RCV3, RCV4, RCV5, RCV6, RCV7, RCV8, and RCV9.

S12. Obtain echo data received by the target receiving unit group.

It should be noted that each receiving unit may include one or more pixels.

It should also be noted that the LiDAR can sequentially control on-off states of emitters in the emission unit to detect the target object.

In this embodiment of this application, a terminal device can also control an on-off state of an emitter in an emission unit of array LiDAR, to detect the target object, and then a target receiving unit group in a receiving area array of the receiving unit receives echo data reflected by a target object in a scanning region.

Figure 5:
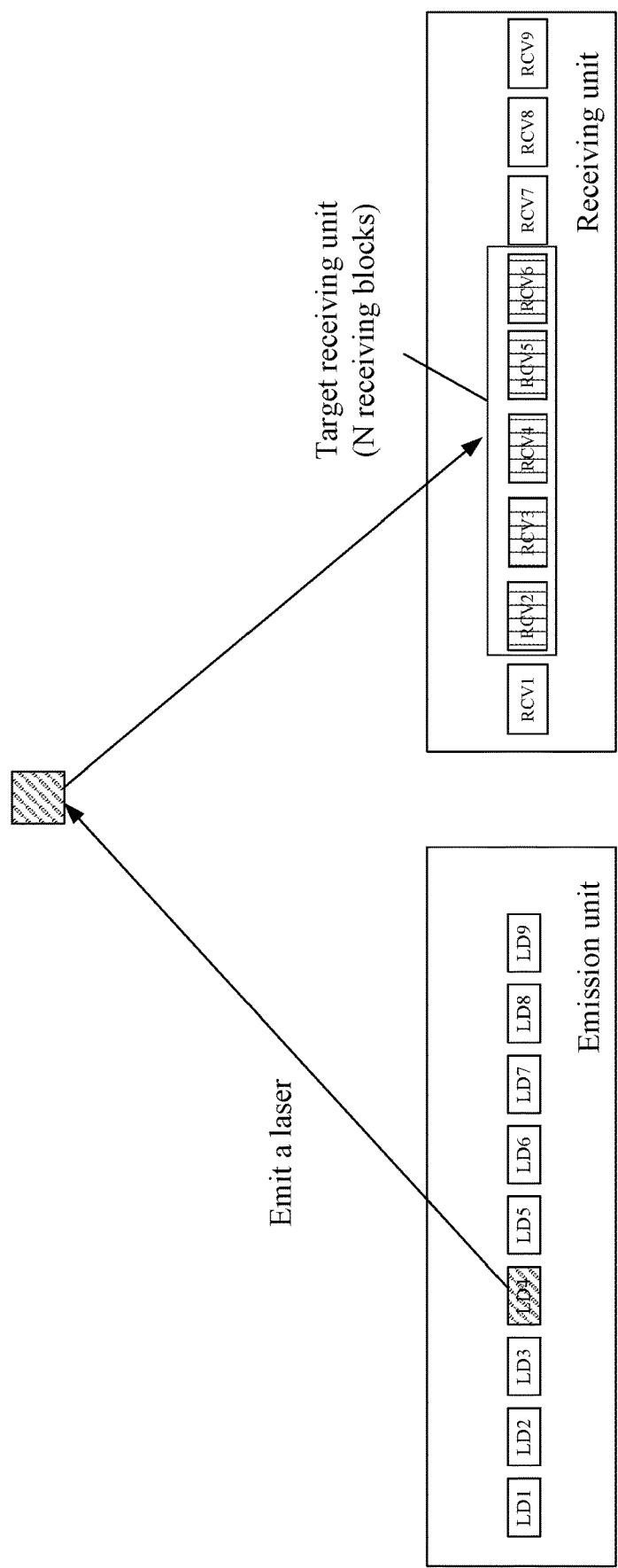
FIG. 5 is a schematic diagram of a scenario of a target receiving unit group according to an embodiment of this application.

Exemplarily, as shown in FIG. 5, an emission array turns on one emitter (emission unit) and N receiving units (that is, a target receiving unit group corresponding to the emission unit) during receiving.

Further referring to FIG. 3, when LD1 is turned on to emit a laser, RCV1, RCV2, and RCV3 are turned on to receive echo data; when LD2 is turned on to emit a laser, RCV1, RCV2, RCV3, and RCV4 are turned on to receive echo data; when LD3 is turned on to emit a laser, RCV1, RCV2, RCV3, RCV4, and RCV5 are turned on to receive echo data; when LD4 is turned on to emit a laser, RCV2, RCV3, RCV4, RCV5, and RCV6 are turned on to receive echo data; when LD5 is turned on to emit a laser, RCV3, RCV4, RCV5, RCV6, and RCV7 are turned on to receive echo data; when LD6 is turned on to emit a laser, RCV4, RCV5, RCV6, RCV7, and RCV8 are turned on to receive echo data; when LD7 is turned on to emit a laser, RCV5, RCV6, RCV7, RCV8, and RCV9 are turned on to receive echo data; when LD8 is turned on to emit a laser, RCV6, RCV7, RCV8, and RCV9 are turned on to receive echo data; or when LD9 is turned on to emit a laser, RCV7, RCV8, and RCV9 are turned on to receive echo data.

Figure 6:
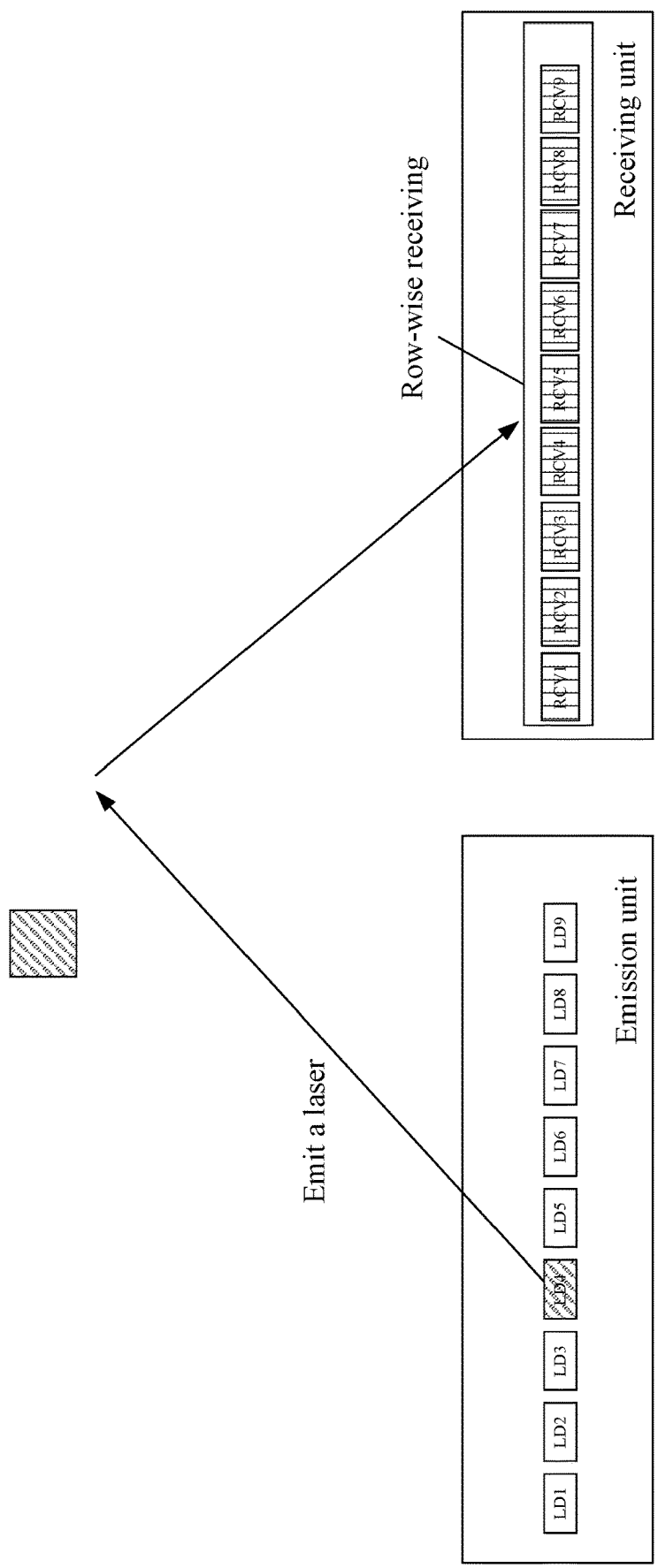
FIG. 6 is a schematic diagram of a row-wise receiving scenario according to an embodiment of this application.

Further, exemplarily, as shown in FIG. 6, the emission array turns on one emitter and an entire row of receiving blocks during receiving.

Further referring to FIG. 4, when LD1 is turned on to emit a laser, RCV1, RCV2, RCV3, RCV4, RCV5, RCV6, RCV7, RCV8, and RCV9 are turned on to receive echo data; when LD2 is turned on to emit a laser, RCV1, RCV2, RCV3, RCV4, RCV5, RCV6, RCV7, RCV8, and RCV9 are also turned on to receive echo data; when LD3 is turned on to emit a laser, RCV1, RCV2, RCV3, RCV4, RCV5, RCV6, RCV7, RCV8, and RCV9 are also turned on to receive echo data; when LD4 is turned on to emit a laser, RCV1, RCV2, RCV3, RCV4, RCV5, RCV6, RCV7, RCV8, and RCV9 are also turned on to receive echo data; when LD5 is turned on to emit a laser, RCV1, RCV2, RCV3, RCV4, RCV5, RCV6, RCV7, RCV8, and RCV9 are also turned on to receive echo data; when LD6 is turned on to emit a laser, RCV1, RCV2, RCV3, RCV4, RCV5, RCV6, RCV7, RCV8, and RCV9 are also turned on to receive echo data; when LD7 is turned on to emit a laser, RCV1, RCV2, RCV3, RCV4, RCV5, RCV6, RCV7, RCV8, and RCV9 are also turned on to receive echo data; when LD8 is turned on to emit a laser, RCV1, RCV2, RCV3, RCV4, RCV5, RCV6, RCV7, RCV8, and RCV9 are also turned on to receive echo data; or when LD9 is turned on to emit a laser, RCV1, RCV2, RCV3, RCV4, RCV5, RCV6, RCV7, RCV8, and RCV9 are also turned on to receive echo data.

Therefore, after receiving the radar data, the target receiving unit group of the LiDAR can upload the radar data to a terminal device in real time that communicates with the LiDAR, and the terminal device can also send a data obtaining request to the LiDAR in real time to obtain the radar data.

In an embodiment of this application, the terminal device may send a scanning instruction to the LiDAR to control the LiDAR to scan in a preset scanning mode, and return received radar data to the terminal device, so that the terminal device further performs data processing.

In an embodiment, the foregoing preset scanning mode means controlling emitters (diodes or lasers) of the emission unit to emit lasers in sequence and controlling the target receiving unit group to receive data until all array emitters of the emission unit complete the emission.

Figure 7:
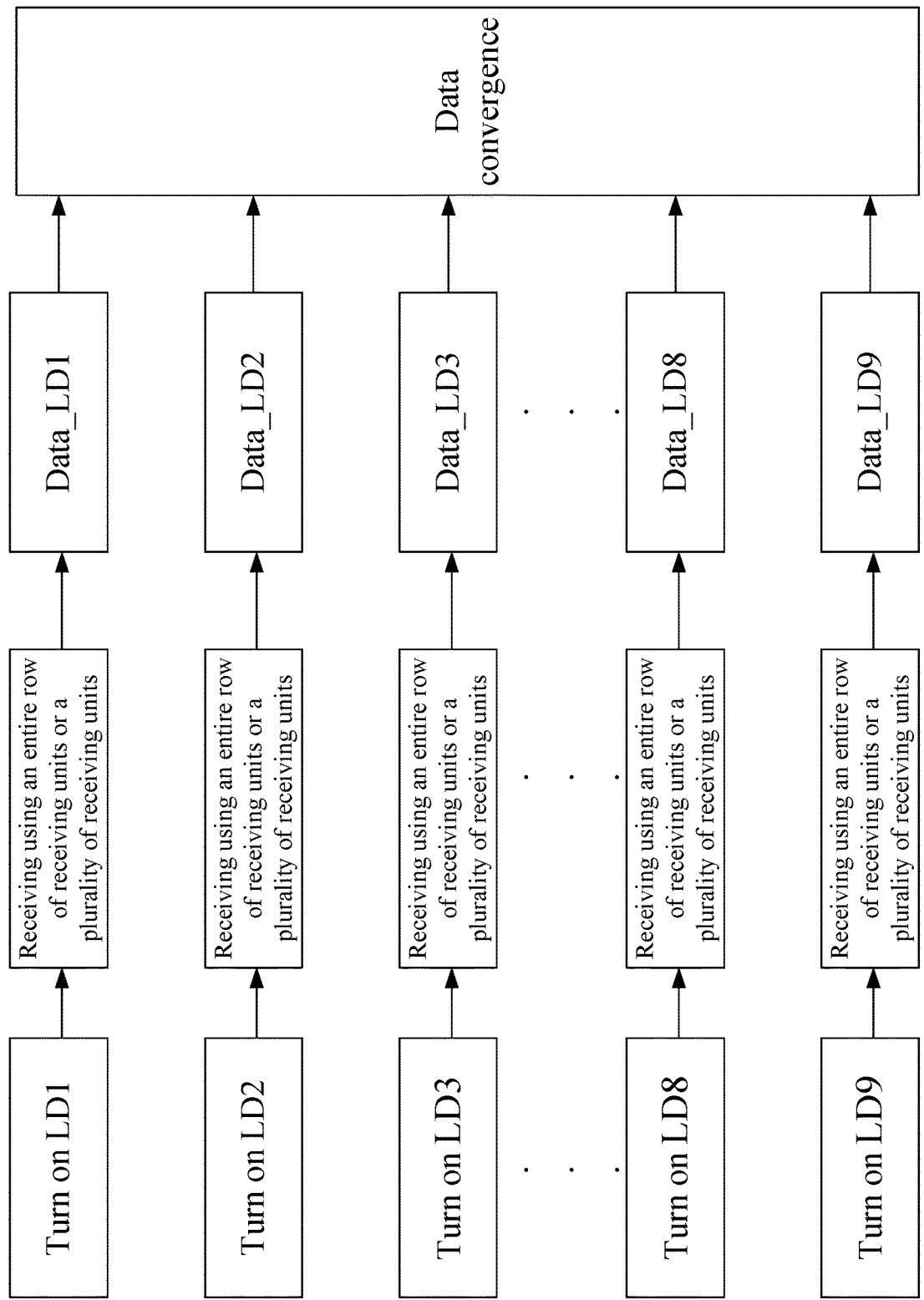
FIG. 7 is a schematic diagram of an application scenario of a radar data processing method according to an embodiment of this application.

Exemplarily, referring to FIG. 7, take a single row of emitters as an example. Firstly, LD1 is turned on to emit a laser, and a plurality of receiving units (the receiving units included in the target receiving unit group) or row-wise receiving is used for receiving (obtained echo data is echo data Data_LD1); secondly, LD2 is turned on to emit a laser, and a plurality of receiving units or row-wise receiving is used for receiving (obtained echo data is echo data Data_LD2); thirdly, LD3 is turned on to emit a laser, and a plurality of receiving units or row-wise receiving is used for receiving (obtained echo data is echo data Data_LD3); and these operations are performed cyclically in such sequence until the last LD in the same row emits a laser to complete scanning (that is, LD9 is turned on to emit a laser, and a plurality of receiving units or row-wise receiving (obtained echo data is echo data Data_LD9) is used for receiving).

In this embodiment of this application, after obtaining the radar data, the terminal device may store the radar data in a memory. For example, each time the target receiving unit group receives echo data, the target receiving unit group can transmit the echo data back to the terminal device, so that the terminal device processes the echo data.

S13. Converge the echo data to obtain a convergence result.

In this embodiment of this application, a process of converging echo data means converging a plurality of pieces of received echo data. For example, first received echo data may be converged with second received echo data, to obtain a convergence result of the first received echo data and the second received echo data. Then the convergence result of the first received echo data and the second received echo data is converged with third received echo data, to obtain a convergence result with the convergence result of the first received echo data and the second received echo data and the third received echo data, and so on until last received echo data is converged and a total convergence result is obtained. In some embodiments, the echo data can also be converged in a parallel manner. That is, after all the echo data (that is, after receiving a reflected echo of a signal emitted by the last LD is completed) is received, all the echo data is converged. In some embodiments, the echo data can also be converged in both the serial manner and the parallel manner. That is, firstly, first received echo data is converged with second received echo data, to obtain a convergence result (referred to as a first convergence result) of the first received echo data and the second received echo data, and then third received echo data is converged with fourth received echo data, to obtain a convergence result (referred to as a second convergence result) of the third received echo data and the fourth received echo data, and so on, and then the first convergence result and the second convergence result are converged, and so on until all the echo data is converged.

In an embodiment of this application, the echo data received after the emission of each emission unit may also be weighted first, and then converged, to obtain converged data corresponding to the emission unit.

In some embodiments, a receiving range is calculated based on a distance value of each receiving unit and a position of the emission unit; a main receiving unit is determined based on the receiving range; data receiving weight of each receiving unit is determined based on a distance between each receiving unit and the main receiving unit; the echo data is weighted based on the data receiving weight of each receiving unit; and the weighted echo data is converged based on the same receiving unit until all the echo data is converged.

Exemplarily, the distance value of each receiving unit in the target receiving unit group corresponding to each emission unit is obtained, and an average of distance values is calculated. Based on the average of distance values and the position of the emission unit, the receiving range is calculated, then the main receiving unit is determined based on the receiving range, and a weight value is set based on the main receiving unit. For example, the weight of echo data corresponding to a receiving unit closer to the main receiving unit is set to be higher, and the weight of echo data corresponding to a receiving unit farther away from the main receiving unit is set to be lower. After echo data received by the target receiving unit group is weighted based on the set weight, weighted echo data can be obtained.

In this embodiment of this application, the echo data is converged to obtain a convergence result. That is, a plurality of pieces of received echo data are converged based on the same receiving unit until all echo data is converged.

Figure 8:
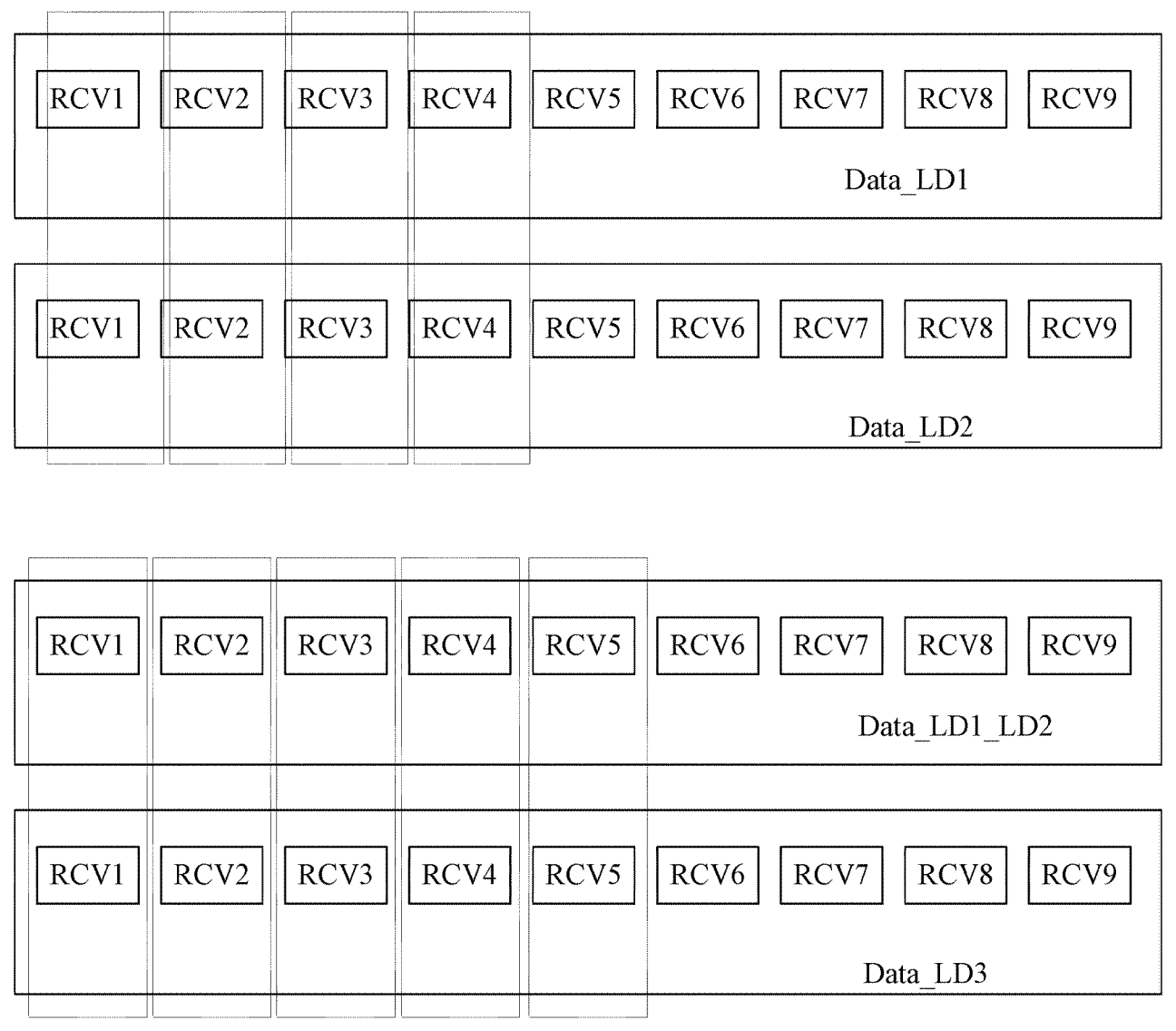

It should be noted that, during the convergence process of the echo data, echo data needs to be converged based on the same receiving unit. Exemplarily, as shown in FIG. 8, it is assumed that when LD1 emits a laser, data received by the target receiving unit group (including RCV1, RCV2, and RCV3) is DATA_LD1; when LD2 emits a laser, data received by target receiving units group (including RCV1, RCV2, RCV3, and RCV4) is DATA_LD2. Therefore, when DATA_LD1 is converged with DATA_LD2, a value received by RCV1 in DATA_LD1 is converged with a value received by RCV1 in DATA_LD2 (or a weighted value); a value received by RCV2 in DATA_LD1 is converged with a value received by RCV2 in DATA_LD2; a value received by RCV3 in DATA_LD1 is converged with a value received by RCV3 in DATA_LD2; and a value received by RCV4 in DATA_LD1 (it should be noted that when LD1 emits a laser, the target receiving unit does not include RCV4, and therefore, the value is invalid) is converged with a value received by RCV4 in DATA_LD2, to obtain a convergence result DATA_LD1_LD2 of DATA_LD1 and DATA_LD2.

When the convergence result DATA_LD1_LD2 is converged with DATA_LD3 (data received by the target receiving unit (including RCV1, RCV2, RCV3, RCV4, and RCV5) when LD2 emits a laser), similarly, a value of RCV1 in DATA_LD1_LD2 is converged with a value of RCV1 in DATA_LD3, a value of RCV2 in DATA_LD1_LD2 is converged with a value of RCV2 in DATA_LD3, a value of RCV3 in DATA_LD1_LD2 is converged with a value of RCV3 in DATA_LD3, a value of RCV4 in DATA_LD1_LD2 is converged with a value of RCV4 in DATA_LD3, and a value of RCV5 in DATA_LD1_LD2 (it should be noted that the value of RCV5 in DATA_LD1_LD2 is also invalid) is converged with a value of RCV5 in DATA_LD3, and so on until DATA_LD9 (the echo data received by the target receiving unit when LD9 emits a laser) is converged.

Figure 9:
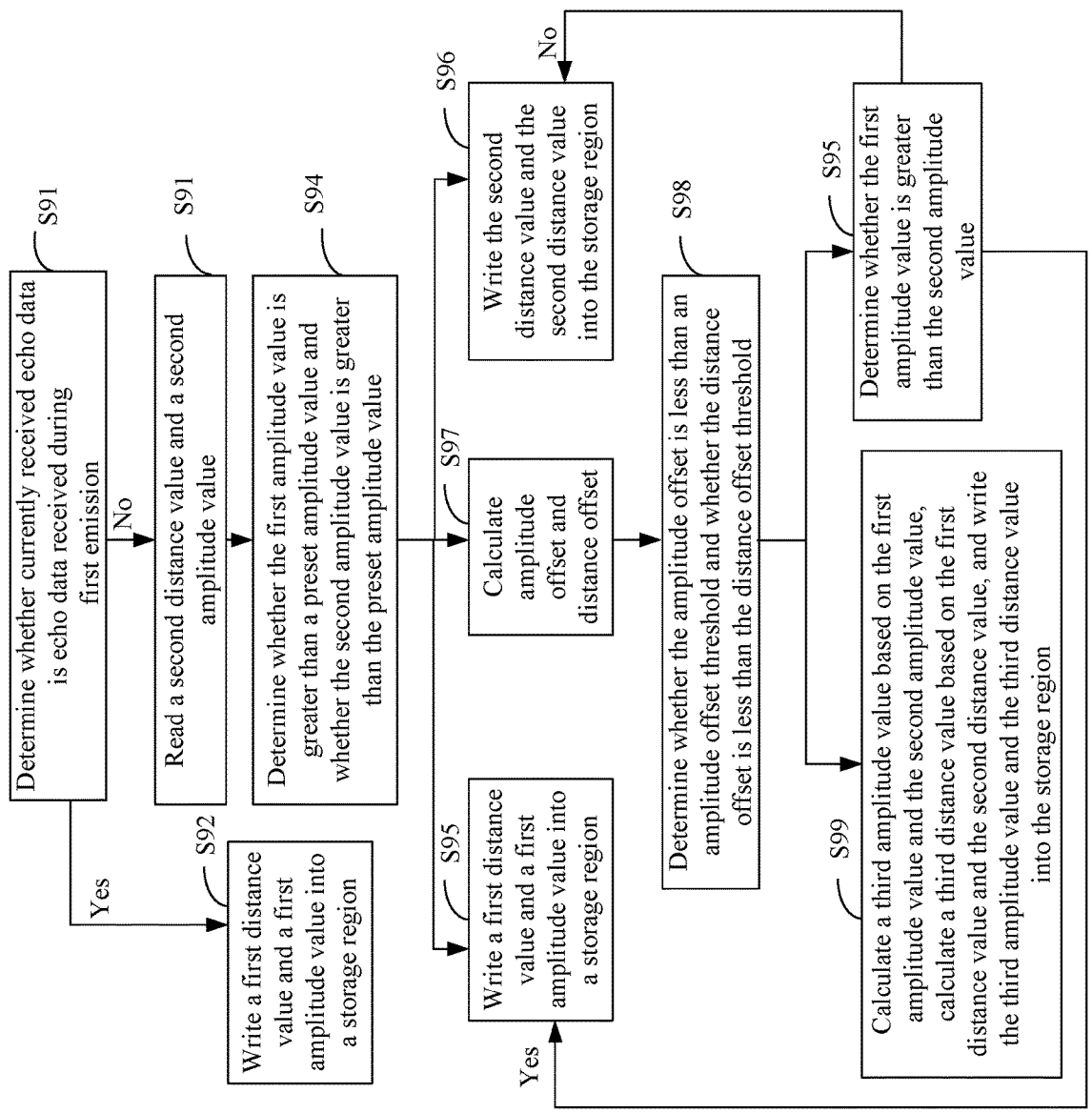
FIG. 9 is a schematic flowchart of implementation of a data convergence process according to an embodiment of this application.

To further illustrate the data convergence process, FIG. 9 is a schematic flowchart of an implementation of a data convergence process according to an embodiment of this application (only a convergence process of two groups of data is used for exemplary illustration). As shown in FIG. 9, the foregoing data convergence process may include steps S91 to S910. Details are as follows:

S91. Determine whether currently received echo data is the echo data received during the first emission, and if yes, perform step S92, or if no, perform step S93.

S92. Write a first distance value and a first amplitude value into a storage region, where the first distance value is a distance value corresponding to the currently received echo data, and the first amplitude value is an amplitude value corresponding to the currently received echo data.

In this embodiment of this application, when a group of data is received, it can be first determined whether the group of data is the echo data received during the first transmission (that is, echo data received by the target receiving unit when the LD1 is turned on for laser emission). If the group of data is the echo data received during the first transmission, it indicates that no data has not been converged yet, and the first distance value and the first amplitude value corresponding to the echo data are directly written into the storage region for further convergence with the echo data received during the second transmission.

It should be noted that, during each emission measurement, the obtained echo data includes the distance value and the amplitude value. The distance value refers to the distance from the target object to the LiDAR. The amplitude value can be expressed in various manners, for example, the width of an echo waveform, the integrated intensity of the echo waveform, or the slope of the echo waveform.

In addition, before the LiDAR starts measuring the target object, data stored in the storage region can also be deleted.

S93. Read a second distance value and a second amplitude value, where the second distance value is the distance value stored in the storage region, and the second amplitude value is the amplitude value stored in the storage region.

Therefore, because the currently received echo data is not the echo data received during the first transmission, it indicates that the last data convergence result has been stored in the storage region. Therefore, the stored distance value (second distance value) and amplitude value (second amplitude value) need to be read from the storage region, to converge the currently received echo data with the last convergence result (herein, it should be noted that, if the currently received echo data is data received during the second emission, the data received during the first transmission (stored in an access region) is converged with the data received during the second emission; or if the currently received echo data is data received during the third emission, the data stored in the storage region is the convergence result of the data received during the first emission and the echo data received during the second emission).

S94. Determine whether the first amplitude value is greater than a preset amplitude value and whether the second amplitude value is greater than the preset amplitude value. If the first amplitude value is greater than the preset amplitude value and the second amplitude value is not greater than the preset amplitude value, perform step S95; if the first amplitude value is not greater than the preset amplitude value and the second amplitude value is greater than the preset amplitude value, perform step S96; or if the first amplitude value is greater than the preset amplitude value and the second amplitude value is also greater than the preset amplitude value, perform step S97.

It should be noted that, the preset amplitude value can be set based on an actual scenario. This is not limited in this application.

To avoid noise interference and ensure the validity of a measurement result, it is necessary to first determine whether the first amplitude value and the second amplitude value are greater than the preset amplitude value. If the first amplitude value and the second amplitude value are not greater than the preset amplitude value, noise is determined. If the first amplitude value is not greater than the preset amplitude value and the second amplitude value is greater than the preset amplitude value, it indicates that the currently received echo data is noise, and therefore, the data stored in the storage region is directly reserved; or if the second amplitude value is not greater than the preset amplitude value and the first amplitude value is greater than the preset amplitude value, it indicates that the data stored in the storage region is probably invalid, and therefore, the currently received data can be directly reserved.

It should be noted that, if the first amplitude value is not greater than the preset amplitude value and the second amplitude value is also not greater than the preset amplitude value, one piece of data may be randomly reserved.

S95. Write the first distance value and the first amplitude value into the storage region.

S96. Write the second distance value and the second amplitude value into the storage region.

S97. Calculate amplitude offset and distance offset.

The amplitude offset is a difference between the first amplitude value and the second amplitude value, and the distance offset is the difference between the first distance value and the second distance value.

Herein, because both the first amplitude value and the second amplitude value are greater than an amplitude threshold, it indicates that the currently received echo data and the convergence result stored in the storage region are both valid, and therefore, a convergence result needs to be further calculated.

S98. Determine whether the amplitude offset is less than an amplitude offset threshold and whether the distance offset is less than the distance offset threshold. If the amplitude offset is less than the amplitude offset threshold and the distance offset is less than the distance offset threshold, perform step S99; otherwise, perform step S910.

It should be noted that, the amplitude offset threshold and the distance offset threshold may be determined based on an actual application scenario. This is not limited in this application.

S99. Calculate a third amplitude value based on the first amplitude value and the second amplitude value, calculate a third distance value based on the first distance value and the second distance value, and write the third amplitude value and the third distance value into the storage region.

If the amplitude offset is less than the amplitude offset threshold and the distance offset is less than the distance offset threshold, it indicates that the currently received echo data is highly similar to the data reserved in the storage region, and therefore, a weighted average, a median or an average can be calculated based on the two pieces of data, to obtain a convergence result.

It should be noted that, when the third amplitude value is calculated based on the first amplitude value and the second amplitude value, the third amplitude value may be determined by using the weighted average, the median, and the average. The median can be used to determine the third magnitude value only when there are more than two pieces of converged data. The weight is set based on the magnitude of the amplitude value. That is, the greater the amplitude value, the greater the weight; or the smaller the amplitude value, the smaller the weight.

Similarly, when the third distance value is calculated based on the first distance value and the second distance value, the third distance value may be determined by using the weighted average, the median, and the average. The median can be used to determine the third distance value only when there are more than two pieces of converged data. The weight is set based on the magnitude of the amplitude value. That is, the greater the amplitude value, the greater the weight; or the smaller the amplitude value, the smaller the weight.

S910. Determine whether the first amplitude value is greater than the second amplitude value. If yes, perform step S95; otherwise, perform step S96.

If similarity between the currently received echo data and the data reserved in the storage region is relatively low (that is, the amplitude offset is not less than the amplitude offset threshold and the distance offset is less than the distance offset threshold), it is determined which data has a greater amplitude value, and the data having the greater amplitude value is reserved. That is, if the first amplitude value is greater than the second amplitude value, the first distance value and the first amplitude value are written into the storage region; or if the first amplitude value is not greater than the second amplitude value, the second distance value and the second amplitude value are written into the storage region.

It should be noted that, in the data convergence process shown in FIG. 9, a process of converging only two groups of data is used to describe the data convergence process. In actual applications, the data convergence process can also be applied to the convergence of three or more groups of data.

It should also be noted that, in the data convergence process, after current data convergence is completed, it can also be determined whether all the echo data has been converged. If yes, a data result finally stored in the storage region is used as a convergence result; otherwise, steps S91 to S910 are performed again until all the echo data is converged.

S14. Determine a distance of a target object based on the convergence result.

In an exemplary application, echo waveform is restored based on the convergence result, to determine the distance of the target object. For this part, refer to an existing echo waveform restoration method and a distance determining algorithm. Details are described in this application.

It can be seen from the foregoing descriptions that, in the radar data processing method provided in the embodiments of this application, the target receiving unit with the mapping offset is covered, to receive the echo data, and then the plurality of pieces of received echo data is converged, to ensure complete reception of the echo signal. Then, ranging is performed based on the converged data, to accurately obtain the position of the target object, thereby solving a problem that the receiving unit in the existing LiDAR cannot effectively receive the echo, and the target object cannot be detected due to the corresponding transceiving relationship.

It should be understood that a sequence number of each step in the foregoing embodiments does not mean an execution sequence. An execution sequence of each process should be determined based on a function and internal logic of each process, and should not constitute any limitation to an implementation process of the embodiments of this application.

Based on the radar data processing method provided in the foregoing embodiment, embodiments of this application further provide an embodiment of a terminal device for implementing the foregoing method embodiment.

Figure 10:
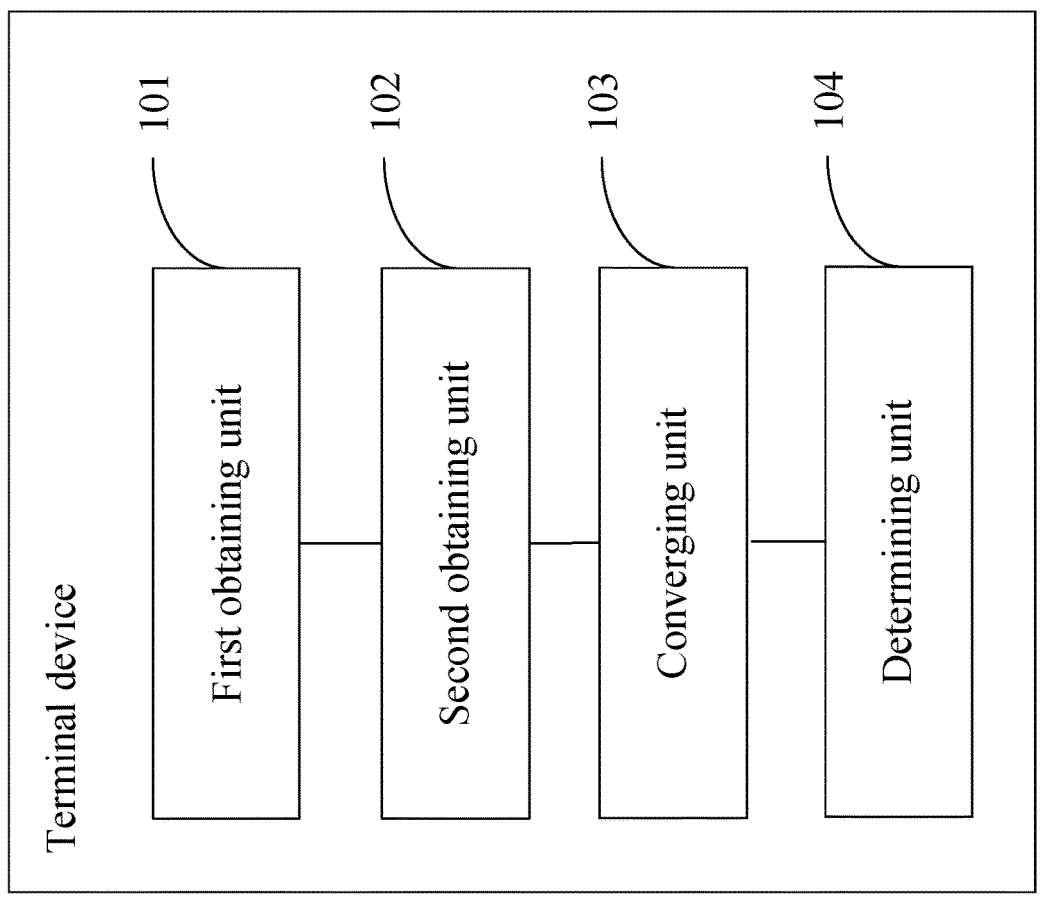
FIG. 10 is a schematic structural diagram of a terminal device according to an embodiment of this application.

Referring to FIG. 10, FIG. 10 is a schematic structural diagram of a terminal device according to an embodiment of this application. In this embodiment of this application, each unit included in the terminal device is configured to perform each step in the embodiment corresponding to FIG. 2. For details, refer to FIG. 2 and related descriptions in the embodiment corresponding to FIG. 2. For ease of description, only a portion related to this embodiment is shown. As shown in FIG. 10, the terminal device 100 includes a first obtaining unit 101, a second obtaining unit 102, a converging unit 103, and a determining unit 104.

The first obtaining unit 101 is configured to obtain a target receiving unit group corresponding to an emission unit.

The second obtaining unit 102 is configured to obtain echo data received by the target receiving unit group, where the target receiving unit group includes N receiving units and N is a positive integer greater than 1.

The converging unit 103 is configured to converge the echo data to obtain a convergence result.

The determining unit 104 is configured to determine a distance of a target object based on the convergence result.

Figure 11:
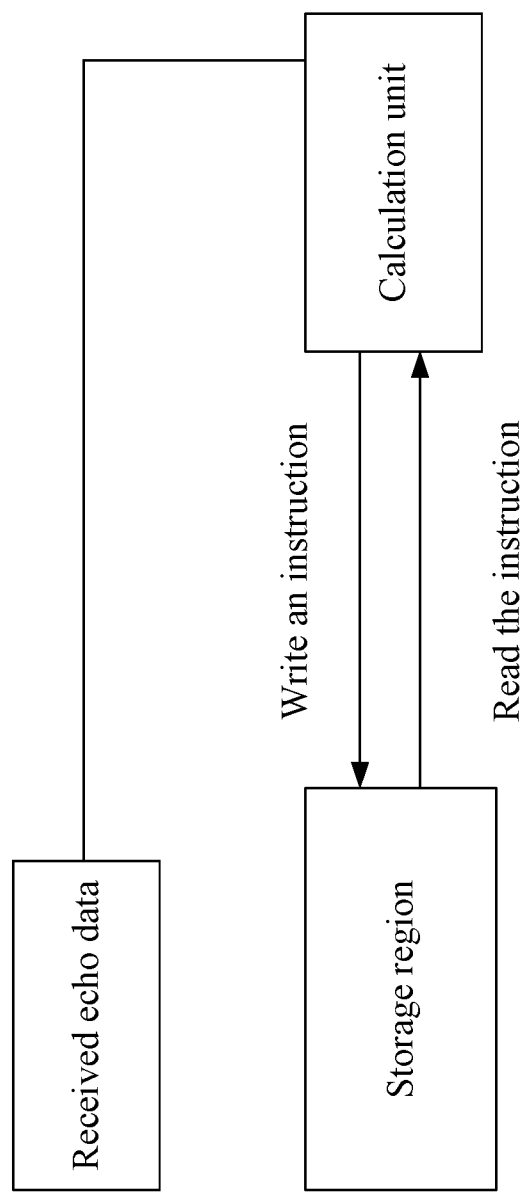
FIG. 11 is a schematic structural diagram of a converging unit according to an embodiment of this application.

In an embodiment of this application, referring to FIG. 11, a structure of the converging unit 103 provided in this embodiment of this application may be shown in FIG. 11, and the converging unit 103 may include a calculation unit and a storage region.

The calculation unit may perform a data convergence process shown in FIG. 9, and the storage region is used to store data obtained by the calculation unit. In this embodiment of this application, the calculation unit may write an instruction to write a first distance value, a second distance value, a third distance value, a first amplitude value, a second amplitude value, and a third amplitude value into the storage region, and can also read an instruction to read the distance value and the amplitude value stored in the storage region from the storage region.

It should be noted that contents such as information exchange and an execution process between the foregoing units are based on the same concept as the method embodiments of this application. For specific functions and technical effects thereof, reference may be made to the method embodiments. Details are not described herein again.

Figure 12:
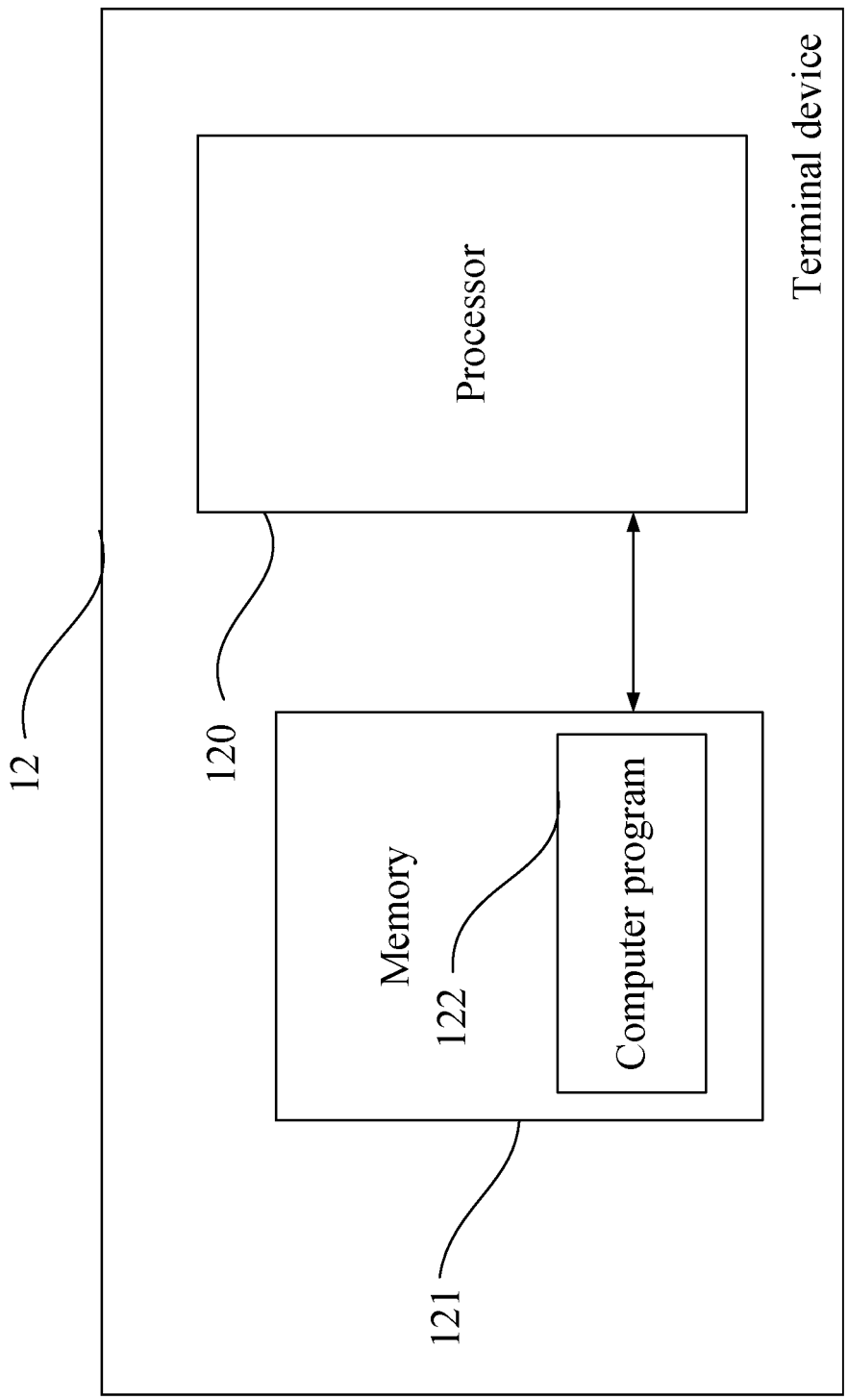
FIG. 12 is a schematic structural diagram of a terminal device according to another embodiment of this application.

FIG. 12 is a schematic structural diagram of a terminal device according to another embodiment of this application. As shown in FIG. 12, the terminal device 12 provided in this embodiment includes: a processor 120, a memory 121, and a computer program 122 stored in the memory 121 and capable of running on the processor 120, for example, an image segmentation program. When executing the computer program 122, the processor 120 performs the steps in each embodiment of the radar data processing method, for example, step S11 to step S14 shown in FIG. 2. Alternatively, when executing the computer program 122, the processor 120 implements functions of the modules or units in each embodiment of the terminal device, for example, functions of the units 101 to 104 shown in FIG. 10.

For example, the computer program 122 may be divided into one or more modules or units, and the one or more modules or units are stored in the memory 121 and are performed by the processor 120 to complete this application. The one or more modules or units may be a series of computer program instruction fields capable of completing specific functions, and the instruction fields are used to describe an execution process of the computer program 122 in the terminal device 12. For example, the computer program 122 may be divided into a first obtaining unit and a first processing unit. For specific functions of the units, refer to relevant descriptions in the embodiment corresponding to FIG. 5. Details will not be described herein again.

The terminal device may include, but is not limited to, the processor 120 and the memory 121. A person skilled in the art can understand that FIG. 12 is only an example of the terminal device 12, and does not constitute a limitation to the terminal device 12. The terminal device may include more or fewer components than those shown in the figure, or a combination of some components, or different components. For example, the terminal device may also include input and output devices, a network access device, a bus, and the like.

The processor 120 may be a Central Processing Unit (CPU), another general-purpose processor, a Digital Signal Processor (DSP), an Application Specific Integrated Circuit (ASIC), a Field-Programmable Gate Array (FPGA), or another programmable logic device, a discrete gate or transistor logic device, a discrete hardware component, or the like. The general-purpose processor may be a microprocessor, or the processor may be any conventional processor or the like.

The memory 121 may be an internal storage unit of the terminal device 12, such as a hard disk or a memory of the terminal device 12. The memory 121 may alternatively be an external storage device of the terminal device 12, for example, a plug-connected hard disk, a Smart Media Card (SMC), a Secure Digital (SD) card, or a flash card (Flash Card) equipped on the terminal device 12. Further, the memory 121 may alternatively include both the internal storage unit and the external storage device of the terminal device 12. The memory 121 is configured to store the computer program and other programs and data required by the terminal device. The memory 121 can also be configured to temporarily store output data or to-be-output data.

Figure 13:
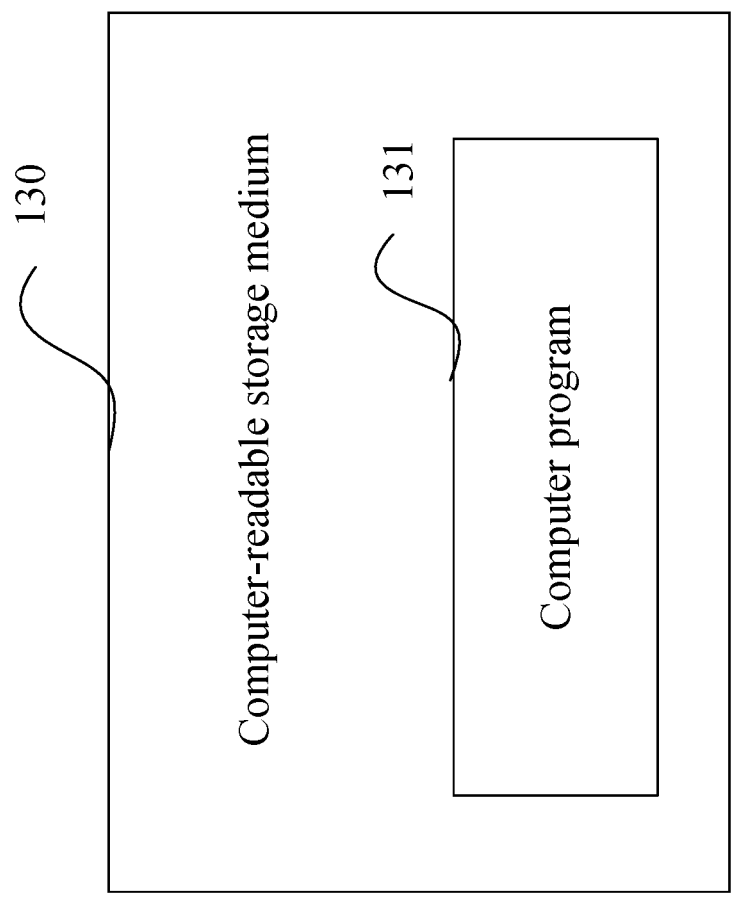
FIG. 13 is a schematic structural diagram of a computer-readable storage medium according to an embodiment of this application.

An embodiment of this application also provides a computer-readable storage medium. Referring to FIG. 13, FIG. 13 is a schematic structural diagram of a computer-readable storage medium according to an embodiment of this application. As shown in FIG. 13, the computer-readable storage medium 130 stores a computer program 131, and when the computer program 131 is executed by the processor, the radar data processing method can be implemented.

An embodiment of this application provides a computer program product, where when the computer program product runs on a terminal device, the terminal device performs the foregoing radar data processing method.

A person skilled in the art can clearly understand that, for ease and brevity of description, the division of the foregoing functional units and modules is taken as an example for illustration. In actual applications, the foregoing functions can be allocated to different units and modules and implemented according to a requirement. That is, an inner structure of the terminal device is divided into different functional units and modules to implement all or a part of the functions described above. The functional units and modules in the embodiments may be integrated into one processing unit, or each unit may exist alone physically, or two or more units may be integrated into one unit. The integrated unit may be implemented in a form of hardware, or may be implemented in a form of a software functional unit. In addition, specific names of the functional units and modules are only for the convenience of distinguishing one another, and are not intended to limit the protection scope of this application. For a detailed working process of units and modules in the foregoing system, reference may be made to a corresponding process in the foregoing method embodiments. Details are not described again herein.

In the foregoing embodiments, the descriptions of the embodiments have respective focuses. For a part that is not described in detail in one embodiment, reference may be made to related descriptions in other embodiments.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

The foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A radar data processing method, comprising:
   obtaining a target receiving unit group corresponding to an emission unit of a LiDAR, wherein the target receiving unit group is first determined based on offsets of mapping positions between the emission unit and a plurality of receiving units, wherein each offset is determined based on:
     a value of an emission angle of view of the emission unit;
     a value of a receiving angle of view of a corresponding receiving unit; and
     a physical distance between the emission unit and the corresponding receiving unit;
   wherein a number of receiving units included in the target receiving unit group increases as at least one of the following three increases:
     the value of the emission angle of view of the emission unit;
     the value of the receiving angle of view of the corresponding receiving unit; and
     the physical distance between the emission unit and the corresponding receiving unit;
   obtaining echo data received by the target receiving unit group;
   converging the echo data to obtain a convergence result; and
   determining a distance of a target object based on the convergence result.

2. The radar data processing method according to claim 1, wherein a number of receiving units in the target receiving unit group is determined based on a value of an emission angle of view of the emission unit and a value of a receiving angle of view of the receiving units of the LiDAR.

3. The radar data processing method according to claim 1, wherein a number of the receiving units in the target receiving unit group is determined based on a physical distance between the emission unit and the receiving units of the LiDAR.

4. The radar data processing method according to claim 1, wherein a number of the receiving units in the target receiving unit group is determined based on a position of the emission unit in an emission array corresponding to the target receiving unit group, and
   wherein a number of the receiving units in the target receiving unit group corresponding to an emission unit at an edge of the emission array is less than the number of receiving units in the target receiving unit group corresponding to an emission unit at a center of the emission array.

5. The radar data processing method according to claim 1, wherein the target receiving unit group comprises an entire row of receiving units.

6. The radar data processing method according to claim 1, wherein the echo data is data obtained by controlling the LiDAR to scan in a preset scanning mode.

7. The radar data processing method according to claim 1, wherein converging the echo data to obtain the convergence result comprises:
   converging a plurality of pieces of received echo data based on a same receiving unit until all echo data is converged.

8. The radar data processing method according to claim 1, wherein converging the echo data to obtain the convergence result further comprises:
   calculating a receiving range based on a distance value of each receiving unit and a position of the emission unit, wherein the distance value of each receiving unit is the distance value corresponding to the echo data received by the receiving unit;
   determining a main receiving unit based on the receiving range;
   determining a weight for echo data received by each receiving unit based on a distance between the receiving unit and the main receiving unit;
   weighting the echo data determined for each receiving unit; and
   converging weighted echo data based on the same receiving unit until all the echo data is converged.

9. A terminal device, comprising:
   a first obtaining unit, configured to obtain a target receiving unit group corresponding to an emission unit, wherein the target receiving unit group is first determined based on offsets of mapping positions between the emission unit and a plurality of receiving units, wherein each offset is determined based on:
     a value of an emission angle of view of the emission unit;
     a value of a receiving angle of view of a corresponding receiving unit; and
     a physical distance between the emission unit and the corresponding receiving unit;
   wherein a number of receiving units included in the target receiving unit group increases as at least one of the following three increases:
     the value of the emission angle of view of the emission unit;
     the value of the receiving angle of view of the corresponding receiving unit; and
     the physical distance between the emission unit and the corresponding receiving unit;

a second obtaining unit, configured to obtain echo data received by a target receiving unit group;

a converging unit, configured to converge the echo data to obtain a convergence result; and a determining unit, configured to determine a distance of a target object based on the convergence result.

10. A terminal device, comprising a memory, a processor, and a computer-readable instruction stored in the memory and capable of running on the processor, when the processor executes the computer-readable instruction, implements a radar data processing method comprising:

obtaining a target receiving unit group corresponding to an emission unit, wherein the target receiving unit group is first determined based on offsets of mapping positions between the emission unit and a plurality of receiving units, wherein each offset is determined based on:

a value of an emission angle of view of the emission unit;

a value of a receiving angle of view of a corresponding receiving unit; and a physical distance between the emission unit and the corresponding receiving unit;

wherein a number of receiving units included in the target receiving unit group increases as at least one of the following three increases:

the value of the emission angle of view of the emission unit;

the value of the receiving angle of view of the corresponding receiving unit; and the physical distance between the emission unit and the corresponding receiving unit;

obtaining echo data received by the target receiving unit group;

converging the echo data to obtain a convergence result; and determining a distance of a target object based on the convergence result.

11. The radar data processing method according to claim 1, wherein each receiving unit includes one or more pixels.

12. The radar data processing method according to claim 6, wherein the preset scanning mode comprises:

controlling emitters of the emission unit to emit lasers in sequence and controlling the target receiving unit group to receive data until the emitters of the emission unit complete the emission.

13. The radar data processing method according to claim 8, wherein the weight of echo data corresponding to the receiving unit closer to the main receiving unit is set to be higher, and the weight of echo data corresponding to the receiving unit farther away from the main receiving unit is set to be lower.

* * * * *